United States Patent
Kocevar et al.

(10) Patent No.: US 11,502,576 B2
(45) Date of Patent: Nov. 15, 2022

(54) ELECTRICAL MACHINE

(71) Applicant: Mahle International GmbH, Stuttgart (DE)

(72) Inventors: Mitja Kocevar, Ajdovscina (SI); Sebastjan Tomazic, Kanal (SI)

(73) Assignee: Mahle International GmbH

( * ) Notice: Subject to any disclaimer, the term of this patent is extended or adjusted under 35 U.S.C. 154(b) by 60 days.

(21) Appl. No.: 16/932,295

(22) Filed: Jul. 17, 2020

(65) Prior Publication Data
US 2021/0021173 A1    Jan. 21, 2021

(30) Foreign Application Priority Data
Jul. 19, 2019 (EP) .................................... 19187316

(51) Int. Cl.
| | |
|---|---|
| *H02K 7/08* | (2006.01) |
| *H02K 5/10* | (2006.01) |
| *H02K 7/10* | (2006.01) |
| *H02K 5/173* | (2006.01) |
| *H02K 7/18* | (2006.01) |

(52) U.S. Cl.
CPC ......... *H02K 7/1004* (2013.01); *H02K 5/1735* (2013.01); *H02K 7/085* (2013.01); *H02K 7/1815* (2013.01)

(58) Field of Classification Search
CPC .. H02K 5/00; H02K 5/10; H02K 5/13; H02K 5/132; H02K 5/16; H02K 5/17; H02K 5/173; H02K 5/1732; H02K 5/1735; H02K 7/00; H02K 7/003; H02K 7/08; H02K 7/083; H02K 7/085; H02K 7/10; H02K 7/1004; H02K 7/18; H02K 7/181; H02K 7/1815; F16C 19/00; F16C 19/06; F16C 33/00; F16C 33/66; F16C 33/76; F16C 33/768
See application file for complete search history.

(56) References Cited

U.S. PATENT DOCUMENTS

| | | | |
|---|---|---|---|
| 5,726,511 A | * | 3/1998 | Kusase ..................... H02K 5/10 310/90 |
| 6,183,208 B1 | | 2/2001 | Qandil et al. |
| 2015/0340922 A1 | | 11/2015 | Kamiya |
| 2018/0138774 A1 | | 5/2018 | Mukai |

FOREIGN PATENT DOCUMENTS

| | | | | |
|---|---|---|---|---|
| EP | 3109978 A1 | | 12/2016 | |
| JP | 58046266 | * | 3/1983 | .............. F16C 33/80 |
| JP | 58068517 | * | 4/1983 | .............. F16C 33/76 |

* cited by examiner

*Primary Examiner* — Tran N Nguyen
(74) *Attorney, Agent, or Firm* — Fishman Stewart PLLC

(57) ABSTRACT

An electrical machine, e.g., a power generator such as an alternator for a motor vehicle, is disclosed. The electrical machine includes a rotor and a stator, and the rotor is non-rotatably secured to a shaft having a shaft end that protrudes out of the rotor. A belt pulley is arranged at the shaft end for coupling to a drive. A bearing is non-rotatably secured to the shaft between the belt pulley and the rotor. A spacer ring is non-rotatably secured to the shaft between the belt pulley and the bearing. A gap which encircles the shaft is disposed between the belt pulley and the spacer ring, and between the spacer ring and the bearing, respectively. A plurality of blades directed radially outwards are arranged in at least one of the respective gaps. The blades convey incoming contaminated air to the outside and protect the respective gap against dirt.

20 Claims, 3 Drawing Sheets

ELECTRICAL MACHINE

CROSS-REFERENCE TO RELATED APPLICATION

This application claims priority to European Application No. 19187316.5 filed on Jul. 19, 2019, the contents of which are hereby incorporated by reference in its entirely.

TECHNICAL FIELD

The invention relates to an electrical machine, in particular to a power generator, and in particular to an alternator for a motor vehicle.

BACKGROUND

An electrical machine can be both an electrical generator—or rather a power generator—and also an electric motor. Power generators—such as alternators for example—are already known from the prior art. They have a stator and a rotor which is non-rotatably secured to a rotatable shaft. In this case, the rotor comprises two pole pieces with, in each case, a plurality of pole fingers which are arranged in an alternating manner on an outer circumference of the rotor. A field coil is arranged in the rotor or rather between the two pole pieces. The field coil can be electrically contacted to the outside by means of two slip rings, so that a magnetic field can be generated around the rotor when a voltage is applied. In this case, the poles of the magnetic field are associated with the respective pole pieces, so that the poles of the magnetic field alternate on the outer circumference of the rotor with the alternating pole fingers. When the rotor is rotating, an alternating current can be induced in electric coils of the stator as a result. To this end, the shaft with the rotor is, at its shaft end, coupled in a torque-transmitting manner to an external drive by means of a belt pulley. In this case, the shaft with the rotor is rotatably mounted within the stator by means of two bearings. In this case, the bearings are usually protected against dirt by seals—such as shaft sealing rings or felt seals or leather seals or rubber seals for example—but these are often inadequate for protecting the bearing. Furthermore, a spacer ring is arranged between the bearing and the belt pulley at the driven shaft end of the shaft. The spacer ring forms, together with a bearing cover, a labyrinth which additionally protects the bearing. However, in a disadvantageous manner, dirt collects in a gap between the spacer ring and the bearing, and this dirt can then enter the bearing. Furthermore, the collected dirt creates a pressure on the seals of the bearing and can even destroy the said seals.

SUMMARY

The object of the invention is therefore to specify, for an electrical machine of the generic type, an improved or at least alternative embodiment in which the described disadvantages are overcome.

According to the invention, this object is achieved by the subject matter of the independent claim(s). Advantageous embodiments are the subject matter of the dependent claims.

An electrical machine can be both an electrical generator—or rather a power generator—and also an electric motor. In the text which follows, the functioning and the advantages of the solution according to the invention will be explained with reference to an electrical generator and in particular an alternator for a motor vehicle. However, this does not rule out the use of the solution according to the invention in electric motors of comparable design and in electrical generators of comparable design.

An electrical machine is in particular an electrical generator, and is in particular an alternator for a motor vehicle. In this case, the electrical machine has a rotor and a stator, wherein the rotor is non-rotatably secured to a shaft having a shaft end which protrudes out of the rotor. The shaft has, at the shaft end, a belt pulley by means of which the machine can be coupled in a torque-transmitting manner to a drive. The electrical machine in the form of the electrical generator can be driven by means of the drive. If the electrical machine is an electric motor, the shaft can be coupled in a torque-transmitting manner to an output drive by means of the belt pulley for the purpose of transmitting the energy which is generated in the electric motor. A bearing is non-rotatably secured to the shaft between the belt pulley and the rotor, the shaft being mounted, such that it can rotate about a rotation axis, with the rotor within the stator by way of the said bearing. A spacer ring is non-rotatably secured to the shaft between the belt pulley and the bearing. A gap which encircles the shaft is formed between the belt pulley and the spacer ring and, respectively, between the spacer ring and the bearing. According to the invention, a plurality of blades which are directed radially to the outside and convey incoming contaminated air to the outside and in this way protect the respective gap against dirt are arranged in at least one of the gaps. The blades can advantageously form a labyrinth within the respective gap.

The bearing can be protected by the blades against dirt which enters the respective gap together with the incoming contaminated air. In this case, the dirt can include, for example, dust, water and aggressive liquids such as petrol, brake fluid, oil, cooling liquids and acids from rechargeable batteries for example. The bearing can also be protected by the solution according to the invention in electrical machines which are used in a heavily soiled environment. Owing to the better protection of the bearing, the service life of the bearing and also of the electrical machine can be extended. Furthermore, the solution according to the invention allows free outflow of water and of steam from the respective gap, so that the working temperature—that is to say the temperature of the bearing during operation—in the bearing is not increased. The service life of the bearing can advantageously be increased in this way.

Provision can advantageously be made for at least some of the respective blades to be formed on the spacer ring and to engage into the gap between the spacer ring and the bearing. As an alternative or in addition, at least some of the respective blades can be formed on the spacer ring and engage into the gap between the belt pulley and the spacer ring. The respective blades can advantageously be integrally formed on the spacer ring.

The spacer ring can advantageously be in one piece and be produced from one material. The spacer ring is preferably produced by sintering, casting or mechanical processing. As an alternative, the spacer ring can be produced from a composite material. For instance, the spacer ring can preferably be produced from metal and plastic.

Provision can advantageously be made for at least some of the respective blades to be formed on the belt pulley and engage into the gap between the belt pulley and the spacer ring. The respective blades can advantageously be integrally formed on the belt pulley.

Provision can advantageously be made for the respective blades to axially partially bridge the respective gap. The bearing can advantageously be received from the outside in a bearing cover which axially separates the rotor from the belt pulley. The bearing cover can then be at a radial distance from the spacer ring.

Advantageously, the spacer ring can contain an inner part and an outer part which is attached to the inner part and comprises the respective blades. The inner part of the spacer ring and the belt pulley are integrally formed from one piece. The inner part can be attached to the wave and the outer part with the blades can be attached to the inner part. The both parts can be disk shaped, wherein the outer part can radially encircle the inner part.

Further important features and advantages of the invention can be found in the dependent claims, in the drawings and in the associated description of figures with reference to the drawings.

It goes without saying that the features mentioned above and those still to be explained below can be used not only in the respectively indicated combination but also in other combinations or on their own, without departing from the scope of the present invention.

Preferred exemplary embodiments of the invention are illustrated in the drawings and will be explained in more detail in the following description, with identical reference symbols relating to identical or similar or functionally identical components.

DETAILED DESCRIPTION

Figure 1:
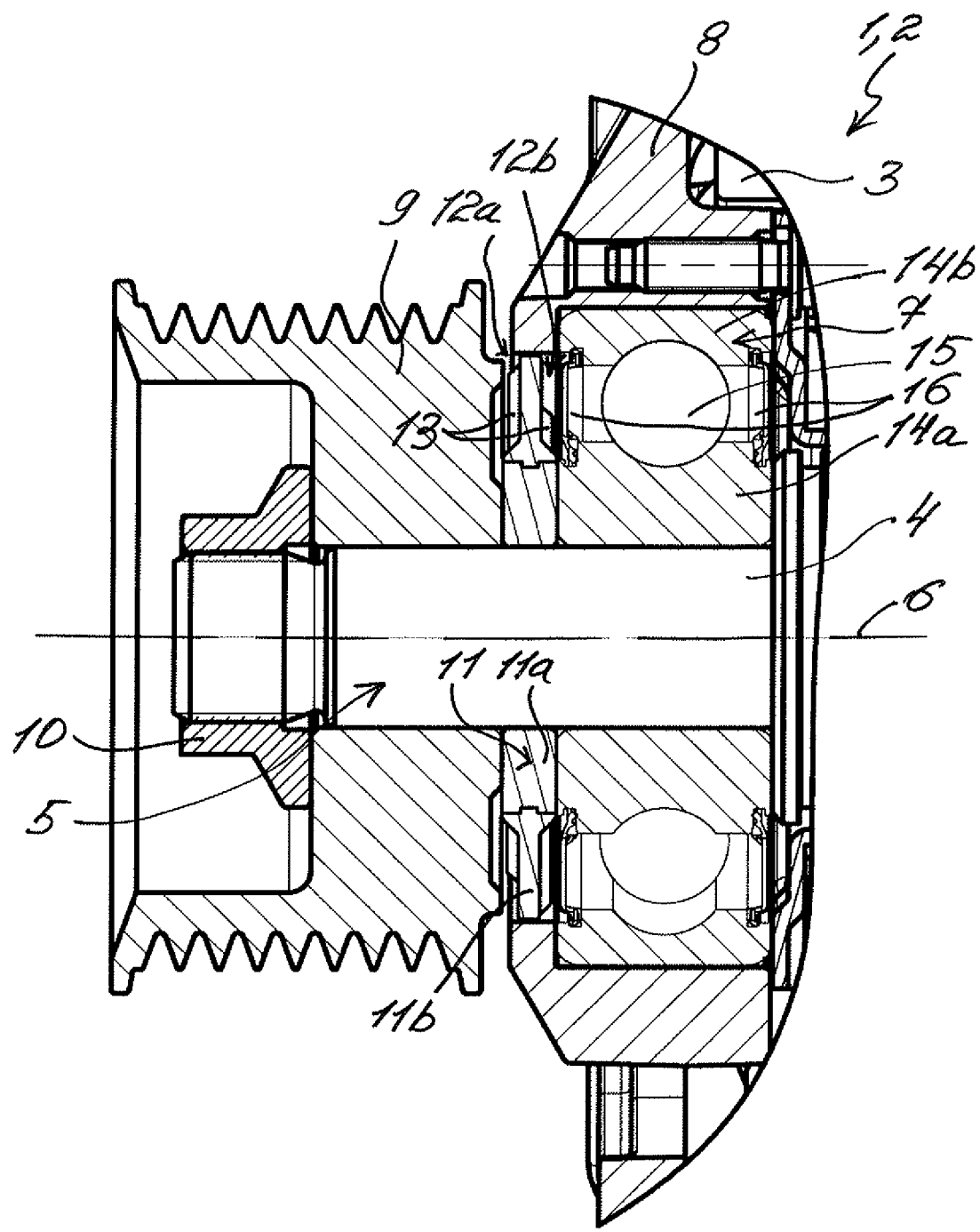
FIG. 1 schematically shows a sectional view of an electrical machine according to the invention at one shaft end.

FIG. 1 shows a sectional view of an electrical machine 1 according to the invention. Here, the electrical machine 1 is an alternator 2 for a motor vehicle. In this case, the machine 1 has a stator—not shown here—and a rotor 3 which is non-rotatably secured on a shaft 4. In this case, a shaft end 5 of the shaft 4 protrudes out of the rotor 3. The shaft end 5 is a so-called front end of the shaft 4. The shaft 4 is mounted, such that it can rotate about a rotation axis 6, with the rotor 3. To this end, a bearing 7—a roller bearing in this exemplary embodiment—is non-rotatably secured to the shaft 4 by way of an inner ring 14a and to a bearing cover 8 by way of an outer ring 14b. In this case, roller bodies 15 of the bearing 7 are protected to the outside on either side by a seal 16 in each case. The bearing 7 is arranged axially adjacent in relation to the rotor 3. The shaft 4 can be coupled in a torque-transmitting manner to a drive by means of a belt pulley 9, so that the electrical machine 1—here an alternator 2—can generate power. The belt pulley 9 is secured to the shaft 4 by a screw 10.

Figure 3:
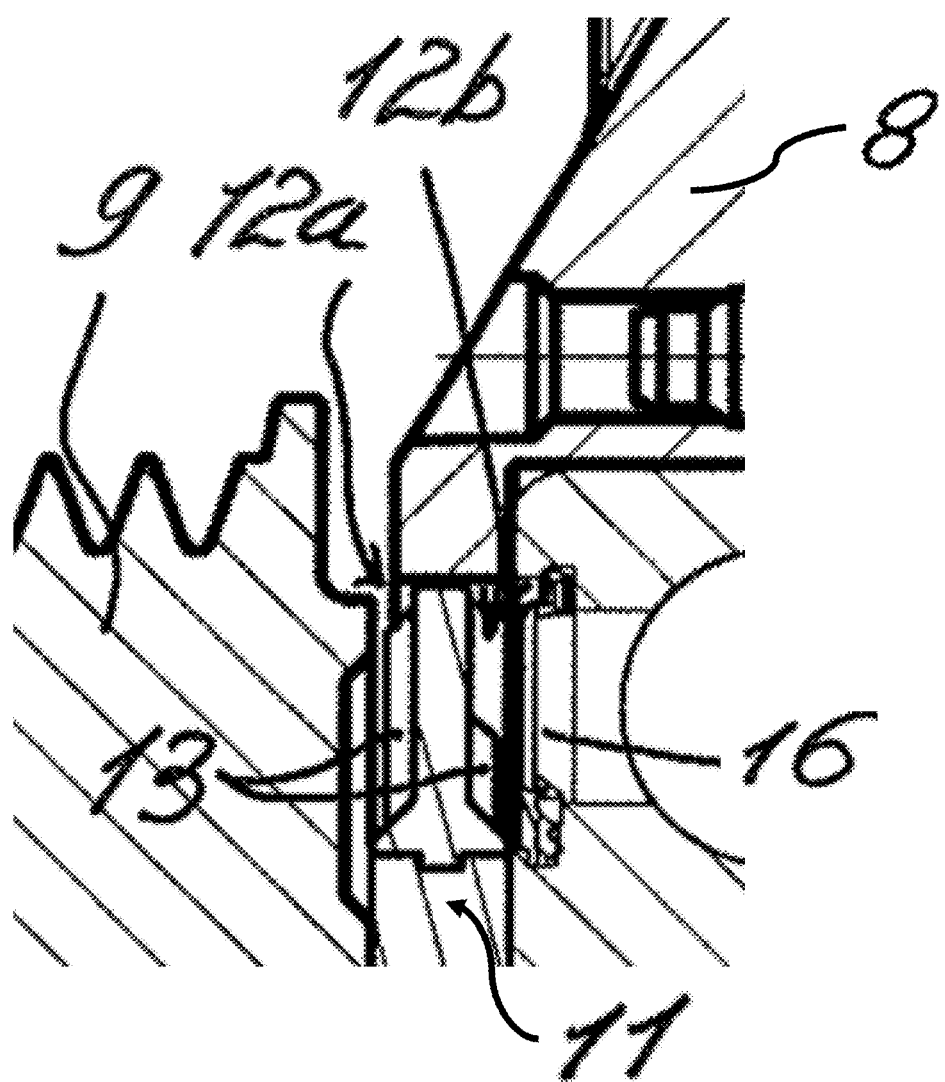
FIG. 3 schematically shows a section view of an enlarged portion of the electrical machine of FIG. 1 in a region of the spacer ring.

A spacer ring 11 is non-rotatably secured to the shaft 4 between the belt pulley 9 and the bearing 7. The spacer ring 11 is generally disc shaped and extends radially with a minimal gap to the bearing cover 8. A gap 12a is formed between the belt pulley 9 and the spacer ring 11 (see FIG. 3). In the same way, a gap 12b is formed between the spacer ring 11 and the bearing 7 (see FIG. 3). In this case, the gaps 12a and 12b encircle the shaft 4. A plurality of blades 13 which are directed radially to the outside and, in this exemplary embodiment, are integrally formed on the spacer ring 11 are arranged in the gaps 12a and 12b. In this case, the blades 13 form a labyrinth within the respective gap 12a and 12b. The bearing 7 can be protected by the blades 13 against dirt which enters the respective gap 12a and 12b together with the incoming contaminated air. The service life of the bearing 7 and also of the electrical machine 1 can be extended in this way. Furthermore, free outflow of water and of steam from the respective gap 12a and 12b is rendered possible, so that the working temperature in the bearing 7 can be reduced.

Figure 2:
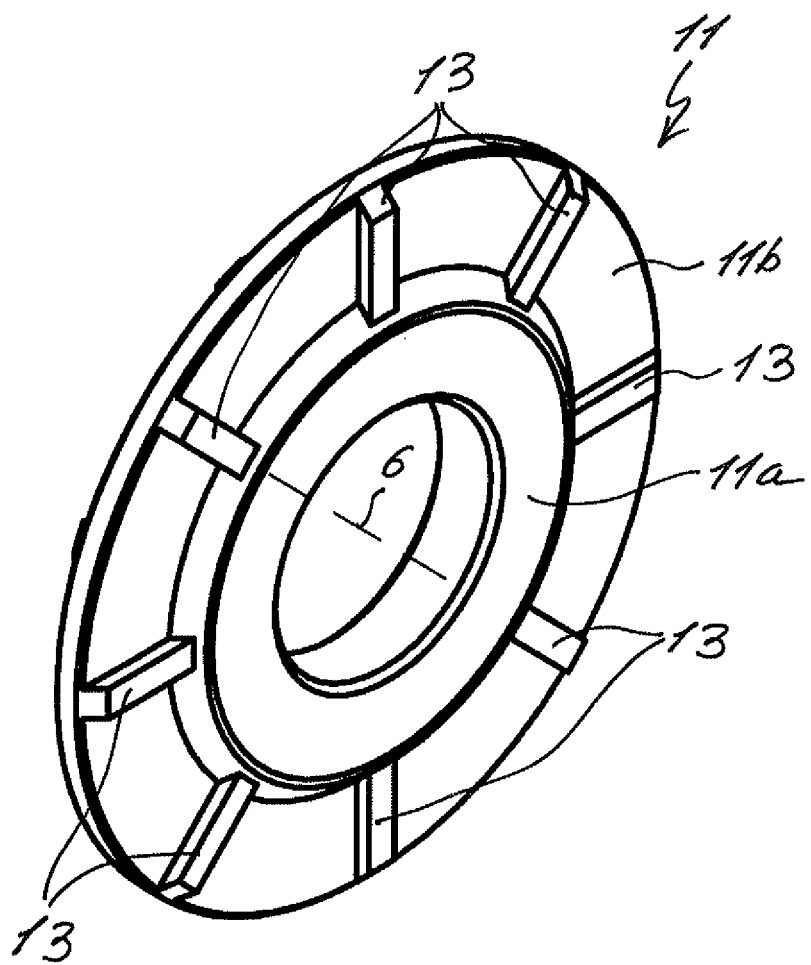
FIG. 2 schematically shows a view of a spacer ring of the electrical machine according to the invention.

FIG. 2 shows a view of the spacer ring. As can be seen particularly clearly here, the respective blades 13 are directed radially to the outside, so that, when the shaft rotates, a pressing force is generated in the respective gap 12a and 12b and the dirt can be conveyed to the outside. The spacer ring 11 is produced from a composite material and is formed in two pieces from an inner part 11a and an outer part 11b, as is also shown in FIG. 1. In this case, the blades 13 are integrally formed on the outer part 11b.

The invention claimed is:

1. An electrical machine, comprising:
a rotor and a stator,
the rotor non-rotatably secured to a shaft having a shaft end that protrudes out of the rotor,
the shaft has, at the shaft end, a belt pulley that can be coupled in a torque-transmitting manner to a drive,
a bearing non-rotatably secured to the shaft between the belt pulley and the rotor, wherein the shaft with the rotor is rotatably mounted about a rotation axis within the stator via the bearing,
a spacer ring non-rotatably secured to the shaft between the belt pulley and the bearing, wherein the spacer ring spaces the bearing from the belt pulley,
wherein two gaps that encircle the shaft are disposed between the belt pulley and the spacer ring, and between the spacer ring and the bearing, respectively, and
a plurality of blades directed radially outwards arranged in at least one of the two gaps, wherein the plurality of blades convey incoming contaminated air to the outside and protect the respective gap against dirt.

2. The electrical machine according to claim 1, wherein the plurality of blades are arranged in the two gaps and provide a labyrinth within the two gaps.

3. The electrical machine according to claim 1, wherein at least some of the plurality of blades are disposed on the spacer ring and engage into one of the two gaps between the spacer ring and the bearing.

4. The electrical machine according to claim 1, wherein at least some of the plurality of blades are disposed on the spacer ring and engage into one of the two gaps between the belt pulley and the spacer ring.

5. The electrical machine according to claim 3, wherein the plurality of blades are integrally formed on the spacer ring.

6. The electrical machine according to claim 3, wherein the spacer ring is in one piece and is composed of one material.

7. The electrical machine according to claim 3, wherein the spacer ring is composed of a composite material.

8. The electrical machine according to claim 1, wherein the plurality of blades axially partially bridge at least one of the two gaps.

9. The electrical machine according to claim 1, wherein:
the bearing is received from the outside in a bearing cover that axially separates the rotor from the belt pulley, and the bearing cover is at a radial distance from the spacer ring.

10. The electrical machine according to claim 1, wherein:
the spacer ring includes an inner part and an outer part, wherein the outer part is attached to the inner part and comprises the plurality of blades, and
the inner part of the spacer ring and the belt pulley are integrally formed from one piece.

11. The electrical machine according to claim 2, wherein at least some of the plurality of blades are disposed on the spacer ring and engage into one of the two gaps between the spacer ring and the bearing ring.

12. The electrical machine according to claim 7, wherein the composite material of the spacer ring includes metal and plastic.

13. An alternator for a motor vehicle, comprising:
a rotor and a stator;
the rotor being non-rotatably secured to a shaft having a shaft end that protrudes out of the rotor;
a belt pulley disposed at the shaft end of the shaft that can be coupled in a torque-transmitting manner to a drive;
a bearing non-rotatably secured to the shaft between the belt pulley and the rotor, wherein the shaft with the rotor is rotatably mounted about a rotation axis within the stator via the bearing;
a spacer ring non-rotatably secured to the shaft between the belt pulley and the bearing, wherein the spacer ring spaces the bearing from the belt pulley;
wherein a first gap and a second gap that encircle the shaft are disposed between the belt pulley and the spacer ring, and between the spacer ring and the bearing, respectively; and
a plurality of blades directed radially outwards arranged in at least one of the first gap and the second gap, wherein the plurality of blades convey incoming contaminated air to the outside to protect the first gap and the second gap against dirt.

14. The alternator according to claim 13, wherein at least some of the plurality of blades are disposed on the spacer ring and engage into the second gap provided between the spacer ring and the bearing.

15. The alternator according to claim 13, wherein at least some of the plurality of blades are disposed on the spacer ring and engage into the first gap provided between the belt pulley and the spacer ring.

16. The alternator according to claim 13, wherein the bearing is protected by respective seals on both axial sides.

17. The electrical machine according to claim 1, wherein the bearing is protected by respective seals on both axial sides.

18. The electrical machine according to claim 1, wherein the spacer ring extends radially outwards to the bearing cover.

19. An electrical machine, comprising:
a rotor and a stator;
the rotor non-rotatably secured to a shaft having a shaft end that protrudes out of the rotor;
a belt pulley disposed at the shaft end that can be coupled in a torque-transmitting manner to a drive;
a bearing non-rotatably secured to the shaft between the belt pulley and the rotor, wherein the shaft with the rotor is rotatably mounted about a rotation axis within the stator via the bearing;
a spacer ring non-rotatably secured to the shaft between the belt pulley and the bearing;
wherein two gaps that encircle the shaft are disposed between the belt pulley and the spacer ring, and between the spacer ring and the bearing, respectively;
a plurality of blades directed radially outwards arranged in at least one of the two gaps, wherein the plurality of blades convey incoming contaminated air to the outside and protect the respective gap against dirt; and
wherein the bearing is protected by respective seals on both axial sides, and wherein one of the respective seals is disposed opposite the spacer ring.

20. The electrical machine according to claim 19, wherein the spacer ring includes an inner part that spaces the bearing from the belt pulley, and an outer part that includes the plurality of blades.

* * * * *